United States Patent Office 2,986,469
Patented May 30, 1961

2,986,469

METHOD FOR PRODUCING FEED

Johannes Krüss, 11 Surderwurden, Bremerhaven, Germany

No Drawing. Filed July 17, 1958, Ser. No. 749,065
19 Claims. (Cl. 99—7)

The present invention relates to animal feed and a method for producing the same. More in particular, the present invention relates to a vitamin-enriched, appetizing animal feed, especially for mammals and fowls, and a method for producing such a feed.

This application is a continuation-in-part of my co-pending application Ser. No. 627,983 filed on December 13, 1956, now forfeited.

It is known in the art to produce a number of animal feeds as a supplement to or even as a substitute for natural and unprocessed animal fodder. However, these products are either extremely expensive or have only a limited nutritive value, or are particularly poor in essential vitamins.

Attempts have, therefore, been made to use fish or fish products as an animal feed, because fish or fish products are not only abundant and inexpensive, but also have a particularly high degree of nutritive and generally wholesome value, especially in regard to their contents of albumin and vitamins.

The fish products used, for instance, in mixtures with comminuted straw or potato mash, or similar carbohydrate-containing products and fermented at slightly elevated temperatures, are mainly so-called fish offals comprising the heads, the spines and similar fishbones, ventricular portions, the skins and sometimes the intestines of fish.

It is also known to treat these fish offals with flour, mill by-products such as bran, chaff, residual flour or the like by fermentation with suitable microorganisms to obtain an animal feed.

The known processes utilizing these raw materials suffer from the drawback of requiring the handling of large volumes of liquid. Furthermore, all of the known animal feeds obtained from these fish or fish products have a particularly pronounced taste and odor which is generally repulsive to animals and hence decreases their appetite. The animals fed with the same, therefore, are prone to consume less food than is desirable and necessary in order to fatten mammals and fowls for marketing and slaughtering, or they soon refuse to consume such feed at all. In addition, the meat of animals fed with fish or fish products assumes a fishy flavor which makes this meat less well tasting than is generally exacted by the modern consumer.

It is, therefore, the general object of the present invention to provide for an animal feed which eliminates the aforementioned disadvantages, and a method for producing such a feed.

It is a particular object of the present invention to provide for an animal feed, particularly for fowls and mammals which is inexpensive and can be easily procured in large quantities, and a method for producing such a feed.

It is still another object of the present invention to provide for an animal feed, particularly suited for consumption by fowls and mammals, containing odorous and flavoring substances which are agreeable to fowls and mammals and stimulate the appetite of these animals, and a method for producing such a feed.

It is a further object of the present invention to provide for an animal feed, particularly for fowls and mammals, which preserves the natural, inoffensive and agreeable taste of the meat of the animals fattened with this feed, and a method for producing such a feed.

It is still a further object of the present invention to provide for an animal feed, particularly for fowls and mammals, which is rich in vitamins, and a method for producing such a feed.

These and other objects are attained and the above described drawbacks of the known methods avoided by the product of my invention and the method for making the same, which comprises the use of de-oiled, concentrated fish solubles which are admixed with mill by-products in a specific condition and are subjected to the fermenting action of those aerobic, and sometimes anaerobic bacteria which can grow in the resulting medium.

According to the method, fish broth obtained from fish or fish waste or by-products, is de-oiled and concentrated. The concentrated fish broth is then subjected to a fermentation brought about by first thoroughly and intimately mixing the fish broth with carbohydrates suitable as a fodder for animals such as milling products and the like, and then exposing the resulting mixture to the action of bacteria belonging to the group of aerobic or anaerobic bacteria, for example, diplococci, which is facultatively anaerobic as stated in Zinsser, Bacteriology, 11th edition, 1957, page 257, column 1, 12th line from the bottom.

This process of fermentation performed by the useful bacteria mentioned hereinbefore, brings about biochemical changes which are being investigated as far as the occurring chemical reactions are concerned. These changes lead, however, to noticeable results in causing the formation of odorous and flavoring substances, which, although not lending themselves thus far to accurate chemical identification, are surprisingly and definitely agreeable to all fowls and mammals. I have ascertained this fact by comprehensive tests. The animal feed obtained by the fermentation described produces olfactory and gustatory sensations to fowls and mammals which induce these animals to feed on the product of the invention with great pleasure, which stimulate their appetite and incite them to devour greater amounts of the feed, both as regards quantity and nutritive value, than it would be the case if unprocessed feed were consumed.

The process of fermentation can be speeded up by inoculating the mixture with suitable bacteria, taken from the group of anaerobic or aerobic, but preferably aerobic bacteria.

A further important feature of this method consists in the step of interrupting, at will, the aforesaid process of fermentation which is in progress due to the influence of the aerobic and/or anaerobic bacteria, by adding to the fermenting mixture sufficient amounts of dehydrating substances to stop the growth of the fermenting bacteria. It is advantageous to use dehydrating substances which also have a good nutritive value, as for example fish meal or meat meal, soybean grist, bone grist, calcium containing compounds such as calcium chloride and similar substances feedable to animals. It is, of course, also possible to employ as de-hydrates a mixture of two or several of the afore-mentioned or similar feeding substances. In case these substances do not possess a sufficient degree of de-hydrating capacity in their commercially available form, they can be brought to a moisture level of approximately 3% of moisture content by previous drying prior to being added to the fermentation mixture as a de-hydrating agent.

In order to prevent acidification of the fermentation mixture during the process of fermentation, acid-binding agents, as for example, calcium carbonate, magnesium carbonate or the like carbonate substances can be added during the fermentation, or after the fermentation is completed.

The product obtained after completion of the process of fermentation can be further processed and enriched by adding supplemental feeding substances, as, for example, calcium salts or the like substances. The process of the present invention can be applied to all organic substances constituting raw fish, fish products or fish parts, substances or products derived therefrom.

In addition to raw fish or parts therefrom, by-products or even waste products obtained by the processing of fish as, for example, the by-products or waste products of the manufacture of fish meal, or the preservation or canning of fish can be used.

I have now discovered by elaborate experiments that the fermentation step up to the time of taking the steps necessary for interrupting the fermentation as described in my earlier application supra, can only yield satisfactory results, and lead to a product having the desired qualities, if certain critical conditions are fulfilled.

The most important one among these conditions requires that the water content of the starting mixture to be subjected to fermentation must not exceed 30%. Otherwise, strains of bacteria will grow in the medium, which might produce harmful effects when the fermented product is used as an animal feed.

Thus, for instance, protein-decomposing bacteria such as *Bacterium liquefaciens*, grow only in media of the nature described, if the water content of the same is much higher than 30%. In fact, all harmful bacteria as well as yeast, which has sometimes been proposed as a fermenting agent in the preparation of animal feeds from fish products, require for their growth the presence of considerably larger quantities of water (such as 70% or more) than are available in the concentrated fish solubles and in the aforesaid mixtures thereof prepared according to the invention. Also, the taste and odor of the resulting fermented product remains so close to the typical "fish" taste, that animals often refuse to consume the end products of the known methods and that acceptance of such products as long as the same still contains traces of repugnant odor and taste-imparting substances. I have now found surprisingly and contrary to all expectation that, if the water content of starting material is limited to 30% and is preferably around 25%, the taste and odor of the fermented product is made fully acceptable to farm animals due to a practically complete suppression of the activity of all bacteria producing repugnant substances in the medium.

Other important conditions and features now discovered by me, will become apparent, as the description of the improved method according to my present invention proceeds.

On the basis of these discoveries, the method according to my invention, comprises the steps of preparing a novel starting mixture in which the fish broth used in my prior method is replaced by a de-oiled, concentrated fish soluble by further concentration obtained from such commercial fish solubles as are well known in the fish processing industry, and described, for instance, by Tressler in "Marine Products of Commerce," 2nd edition (1951).

In a first Step I known per se, crude fish and fish offals are processed in fish meal plants to obtain therefrom fish meal as well as fish oil and the aforesaid concentrated fish solubles as by-products.

The concentrated fish solubles are obtained in these plants by thickening in a plurality of thickeners or evaporators. In contrast to a merely de-oiled fish water pressed off during the de-oiling process, the concentrated fish solubles constitute a stable and therefore storable by-product of the fish meal plants.

A typical composition of the resulting commercial fish solubles is described by Tressler supra on page 485 as being:

50% by weight total content of dry matter (of which 32% consist of protein, 4% of fat, and about 9% of ashes), and 50% of water.

As a next preferred step II according to my invention, the water content of the fish solubles is further reduced to not more than 40%, so that the content of solid matter in the fish solubles is at least 60%.

The next Step III consists of intimately and thoroughly mixing the resulting highly concentrated fish solubles with carbohydrate material suitable as fodder for animals such as the milling products mentioned hereinbefore. This can be done in an efficient stirring apparatus, as for example, the stirring apparatus described in Henglein, Grundriss der deutschen Technik (1936), p. 24. The mixture thereby obtained is then exposed to the action of bacteria belonging to the group of aerobic or sometimes also anaerobic bacteria (for example, diplococci).

Experiments carried out by me have shown that, when using the highly concentrated fish solubles from Step II in mixture with mill products and similar dry or substantially dry carbohydrate containing products and subjecting the same to fermentation, no strains of bacteria will grow in this medium, which might produce harmful effects when the fermented product is used as an animal feed.

However, I have found that the substances imparting an attractive and appetizing taste and odor to the final feed product can only be formed in sufficient quantities to achieve this end, if the starting mixture for the fermentation step, i.e. the aforesaid mixture of highly concentrated fish solubles and carbohydrate material contains at least 20% of the former component. I have also found that the water content of the starting mixture may be higher, i.e. up to about 30%, if the content of fish solubles is higher, while, with a lower content of the latter, the water content of the starting mixture must also be kept lower, for instance, below 25%.

The required degree of concentration of the fish solubles depends also on the water content of the carbohydrate materials available for the preparation of the mixture.

These materials are commercially available with a moisture content of about 10 to 20% by weight. It is preferable to dry these materials (Step IV) prior to their admixture to the fish solubles, at elevated temperature (for instance in hot, dry air of 30° C. to 150° C.) until the humidity of the material has been reduced to 1 to 3%.

If carbohydrate materials of such low humidity are available, then it is possible to admix the same to fish solubles of higher water content such as 50% in the case of the commercially available fish solubles, or even up to 60%, if the fish solubles are freshly prepared. Always, however, the total water content of the resulting starting mixture must not substantially exceed 30%, i.e. the higher the water content of the fish solubles, the more highly dried carbohydrate material must be added. The limit of not less than 20% of fish solubles must, of course, be observed.

Where sufficiently dry carbohydrate material is available, it is thus possible to eliminate the aforesaid Step II and admix the fish solubles having a commercial grade moisture content to the former material.

In order to ensure a thorough and initimate mixture of the two components it is preferred to grind the carbohydrate materials finely, to a grain size of preferably 1 millimeter mesh width.

The starting mixture obtained as described hereinbefore, is then inoculated with bacteria to initiate the fermentation which leads to the formation of the desired odor and taste-imparting substances.

Since harmful bacteria do not grow in the described medium environment containing less than 35% of water, it is not critical which kind of bacteria are used for initiating the fermentation. Thus, it is not necessary to use pure cultures, but mixtures of several strains such as aerobic *Streptococcus lactis*, *Streptococcus cremonis*, *Lactobacillus leichmannii*, and *Acetobacter*, which may also contain such anaerobic bacteria as *Bacterium sacch. butyricus* and *Amylobacter* have been found to act even better than pure artificially grown cultures of any one of these bacteria.

Thus a mixed culture of *Str.cremonis* and *Amylobacter* leads to very satisfactory odor and taste of the resulting feed.

It should be noted in this respect, that these mixtures of useful bacteria are usually present in the locations of a fish processing plant so that no inoculation at all may be required, but all that will be necessary in such plants, is to let the prepared culture medium stand open to permit access of the bacteria present in the plant, and the desired fermentation will start by itself.

Once a plant has been set in operation, it is possible to inoculate a succeeding batch with a small amount of inoculant taken from a preceding batch.

During the fermentation step, the temperature of the medium must be maintained above 0° C. and below 45 to 50° C., and I prefer to limit this range to 10 to 30° C., since, below 10° C. the fermentation takes place very slowly, and above 30° C. it may not be possible to suppress sufficiently all competing, undesirable by-reactions.

The fermentation step according to the method of the invention lasts normally, i.e. between the temperatures of 10 and 30° C. from 8 to 4 days. At temperatures below 10° C., a longer time, for instance two weeks may be required, while temperatures above 30° C. may permit to reduce the fermentation time to 2 to 3 days.

Acid-binding agents such as alkali earth metal carbonates are then added to prevent acidification of the fermentation mixture.

The fermentation is then interrupted by materials of low water content, preferably of about 3%, in such quantities that the water content of the entire mixture is reduced to below 14% to 25%, depending on (a) the share of concentrated fish solubles in the fermentation mixture, and (b) the nature of the dehydrating agent used for interrupting the fermentation.

The higher the share of concentrated fish solubles, the more easily is the fermentation interrupted, i.e. a lesser reduction of the water content of the fermenting mixture will suffice to interrupt the fermentation.

Thus, if the fish solubles content of a fermenting mixture of about 250 kg. is 100 kg., the limit water content, at which fermentation comes to a standstill is at about 18 to 20% by weight.

If the fish solubles content is only about 50 kg. in 250 kg. of fermenting mixture, the fermentation will be interrupted when the water content in the mixture is lowered to about 14 to 16% by weight.

If the dehydrating agent used is an inorganic substance having a high dehydrating effect as well as food-preserving properties, such as, for instance, calcium chloride, then the limit water content at which fermentation comes to a standstill, is usually by 2 to 5% higher than the above-stated limit values.

This interruption, at will, of the fermentation process by the aforesaid measure of dehydrating the reacting mass to such degree that bacteria growth is interrupted, has the great advantage of permitting to continue the fermentation under the control of repeated organoleptic tests until a point is reached at which the testing person finds the taste and odor of product completely satisfactory. Interruption at this point avoids a further progress of the fermentation which may then lead to the formation of less palatable and less desirable olfactory products, and, even if this were not the case, a useless loss of working time is avoided by interruption of the process as soon as a satisfactory composition of the feed has been obtained.

The final feed product is composed of protein, for instance, in amounts from about 20 to 40%, fat (glycerides of fatty acids and other lipids) 1 to 7%, mineral salts (ashes) 2 to 7%, fibrous materials 1 to 8%, and odor and taste determining substances 0.01 to 5%.

The odor and taste of the final product is determined by the presence therein of traces of substances whose presence can in many instances only be shown by highly refined organo-chemical analytical methods. The odor- and taste-determining desirable substances found in the animal feed produced by the method according to the present invention comprise, in a mixture, the total amount of which varies from 0.01 to 5% by weight, i.e. within wide limits, several of the following substances: Furfural, acetaldehyde, crotonaldehyde, valeraldehyde, isovaleraldehyde, butyric acid, isobutyric acid, valeric acid, isovaleric acid, amino-valeraldehyde, piperidin, acetyl-piperidin, amino-piperidin, hydrogen sulfide, methyl mercaptane, methyl mercaptopropyl alcohol. However, this list cannot be considered as complete.

Furthermore, the final fermented product contains per kilogram:

| | | |
|---|---|---|
| Vitamins A | international units | 5,000 to 250,000 |
| Vitamins D | do | 500 to 60,000 |
| Vitamins E | milligrams | 10 to 500 |
| Vitamin $B_{12}$ | micrograms | 50 to 2,000 |
| Thiamin | milligrams | 2 to 100 |
| Riboflavin | do | 1 to 80 |
| Pantothenic acid | do | 10 to 500 |
| Nicotinic acid | do | 10 to 500 |
| Pyridoxin | do | 2 to 200 |
| Folic acid | do | 0.5 to 70 | as well as biotin 0.01 to 10 milligrams, cholin 100 to 5,000 milligrams, and other substances in traces.

The animal feed according to the invention may be further enriched by the addition of such adjuvants as vitamins, mineral body building mixtures, trace elements and the like in order to adapt the particular feed to the specific needs of different types of animals.

Thus, for instance, the need of different domesticated animals such as cattle, hogs, and fowl with regard to body building vitamin or mineral substances and trace elements are very different. The required amounts depend not only on the particular type of animal, but also on its age, on the purpose for which it is fed, for instance breeding, fattening, increase of egg laying power, and furthermore on the season of the year and other factors.

I have made the discovery that the stability of easily decomposible vitamins such as vitamin A may be favorably influenced by admixing the vitamin to the feed produced according to the invention. In this mixture, the well known detrimental effects of the oxygen of the air and/or of mineral adjuvants on the stability of the vitamins is greatly reduced or even completely eliminated.

I mention, by way of example only, the specific requirements of certain animals. Milk cows require, depending on the daily yield of milk, large amounts of phosphorus and calcium, and, furthermore, sodium in order to balance the excessive consumption of potassium, when the cow feeds on fresh vegetal food. Supplemental feeding of vitamins is of vital importance for cows in particular in winter and when breeding calves.

Breeding sows and suckling pigs have a very high need for vitamins A and D and also require small amounts of calcium and phosphorus which must, however, be supplied regularly in rather exact amounts. The ratio of these substances to each other is of essential importance for the satisfactory development of the animals. Thus, the calcium content in a feed for hogs should amount to 0.5 to 1.0%, and the content of phosphorus between 0.35 and 0.70% by weight, while the ratio of calcium to phosphorus should be maintained at from 0.35:1 to 1.50:1. The amounts of vitamins required are very large in particular during the winter months; a breeding sow may require up to 15,000 international units of vitamin A per day.

Fowls have a greater need for vitamins than, for instance, hogs. A uniform and sufficient supply of vitamins is most important in modern intensive keeping of animals. Thus, a laying hen requires up to 3,000 per day of vitamin A, apart from the corresponding high amounts of vitamins D, E, K, $B_1$, $B_2$, and in particular $B_{12}$.

Another important factor in the keeping of these animals is their need for certain trace elements. It is well known that all animals require traces of iron, manganese and copper.

Ruminants require a supply of traces of cobalt in order to make possible the formation of vitamin $B_{12}$ in the digestive system. It has also been found that traces of zinc are useful as an adjuvant to hog feed in order to prevent certain diseases which may occur when calcium and phosphorus are present in unfavorable qauntities in the feed.

Another trace element which is absolutely necessary for all animals is iodine. Lack of iodine leads to diseases of similar symptoms which occur in human beings. Iodine is supplied most favorably as contained in the muscle albumin of fish, and iodine is absorbed by the animal body if supplied in the form of fish muscle albumin even in those cases, where inorganic iodine compounds such as potassium iodine remain ineffective. It is also well known that the iodine content of the soil, the water and the plants decreases rapidly with increasing distance from the coast of the oceans; the feeding of satisfactory amounts of iodine to animals is therefore of particular importance further inland. Similar considerations are valid in the case of fluorine which must be supplied if the teeth of animals, in particular of those attaining a longer life span, such as milk cows, are to develop satisfactorily.

Vitamins may be added to the feed produced according to the invention, in the form of vitamin concentrates, vitamin rich seed oils, fish meal, germinated cereal seeds, fish oils and the like. Mixtures of mineral substances may comprise in particular inorganic salts of hydrochloric, sulfuric, phosphoric and carbonic acids with alkali metals and alkaline earth metals such as sodium, potassium, magnesium, and calcium. Apart from these, there may be added to the feed according to the invention trace elements, either inorganically or organically bound, of iron, manganese, copper, cobalt, zinc, iodine and fluorine.

The invention will be further illustrated by a number of examples given below which are, however, not meant to be limitative in any way.

*Example I*

100 kilograms of de-oiled, concentrated fish solubles having a water content of 40%, and 150 kilograms (kg.) of cereal grist containing about 15% of water are given into a stirring apparatus and are intimately mixed. The mixture obtained is subjected to a process of fermentation by filling the mixture into suitable containers and exposing the same for five days in a fish processing plant to the influence of the air having a room temperature approximately from 16 to 25 degrees centigrade. The fermentation produced by the aerobic bacterial flora always present in the plant brings about a biochemical reaction changing the components of the fish solubles. As a result, odorous and flavoring substances are produced which create pleasant and appetite stimulating sensations to fowls and mammals fed therewith. Upon completion of the fermentation, approximately 240 kg. of animal feed are obtained.

*Example II*

100 kg. of de-oiled, concentrated fish solubles having a water content of about 40% by weight and 80 kg. of a carbohydrate material such as bran having a water content of about 2% are intimately mixed with each other and then subjected to fermentation in the same manner as described in Example I.

After four days, 5 kg. of anhydrous calcium chloride are added to the mixture, whereby the water content of the latter is reduced to 18%, and fermentation is interrupted. The resulting stable mixture represents an excellent animal fodder.

*Example III*

100 kg. of de-oiled, concentrated fish solubles and 150 kg. of cereal grist, both having the same water contents as in Example I, are given into a stirring apparatus and are intimately mixed. The mixture obtained is subjected to a process of fermentation by filling the mixture into suitable containers and exposing the same for several days to the impact of the open air having room temperature (approximately from 16 to 25 degrees centigrade). The fermentation produced by aerobic bacteria brings about a biochemical reaction changing the components of the fish solubles. As a result, odorous and flavoring substances are produced which create pleasant and appetite stimulating sensations to fowls and mammals fed therewith.

The process of fermentation is brought to an end by intimately admixing with the fermentate 50 kg. of calcium carbonate substantially free of water of crystallization as a dehydrating substance, as soon as organoleptic tests reveal a satisfactory odor and flavor of the product, which is the case after about 7 days. Approximately 290 kg. of animal feed are obtained.

*Example IV*

100 kg. of de-oiled, concentrated fish solubles and 150 kg. of cereal grist, both having the same water contents as in Example I, are given into a stirring apparatus and are intimately mixed. The mixture obtained is subjected to an accelerated process of fermentation by inoculation with a culture of aerobic bacteria being preponderantly a mixture of *Str. lactis, Str. cremonis* and *Lactobacillus leichmannii*. As soon as organoleptic tests reveal the development of a satisfactory odor and flavor of the fermentate which is the case after approximately two days, the fermentation is brought to an end by intimately admixing with the fermentate 50 kg. of commercial fish meal as a dehydrating substance. Approximately 290 kg. of animal feed are obtained, containing odorous and flavoring substances which create pleasant and appetite stimulating sensations to fowls and mammals fed therewith.

The product can be further enriched with supplemental feed substances, as for example calcium salt.

*Example V*

100 kg. of concentrated fish solubles having a water content of about 60% are intimately mixed with 220 kg. waste flour (the residual product from a flour mill) having a water content of about 2%. The mixture is inoculated with a cluture of *Streptococcus cremonis* and is left standing in a moderately heated room at a temperature of about 30° C. The fermentation process is terminated after one week, and about 145 kg. of a satisfactory animal feed are obtained, similar to that of the preceding examples.

*Example VI*

100 kg. of concentrated fish solubles having a water content of about 40% are mixed intimately with 50 kg. of cereal grist having a water content of 2% and an admixture of 2 kg. of calcium carbonate and 1 kg. of magnesium carbonate. The resulting mixture is inoculated with a culture of *Streptococcus lactis*, again intimately mixed by stirring, and then left standing for three days at room temperature. About 145 kg. of a satisfactory animal feed according to the invention, similar to that of the preceding examples, are obtained.

Example VII 100 kg. of commercial grade concentrated fish solubles having a water content of about 50% are mixed thoroughly in a Banbury mixer with 400 kg. of mill by-products previously ground to a grain size of 1 millimeter consisting of a mixture of bran, chaff and residual flour and having a water content of 17% by weight. 3 kg. of calcium carbonate are also added to the mixture and the latter is then inoculated with an inoculant consisting of 1 to 5 kg. of a sample of a previously fermented batch. The inoculated mixture which has a water content of about 23.6% is left standing for ten days at 12° C. Organoleptic tests are currently taken after the fourth day, and after the optimal development of taste and odor producing substances in the fermentate has been stated by these tests, the fermentation is interrupted by adding to the fermentate 300 kg. of soybean grist previously dried to a water content of 3%. The water content of the fermenting mixture is thereby reduced to below 16% whereby the fermentation is interrupted. 800 kg. of an animal feed are obtained which has an appetizing odor and taste to animals such as cattle or fowl, and can be stored for a period of 1 year and longer without deterioration.

Example VIII

The product obtained by Example V is further enriched with supplemental feed substances, after a fermentation of four days, by adding thereto 4 kg. of calcium chloride.

Example IX

A staple feed obtained in this manner was analyzed and showed the following composition (per kg.):

| | | |
|---|---|---|
| Protein | grams | 200 |
| Lipids | do | 10 |
| Ashes | do | 20 |
| Fibrous material of cellulose | do | 10 |
| Water | do | 100 |
| Nitrogen-free extraction products (from carbohydrate materials) | grams | 650 |
| Vitamins A | international units | 45,000 |
| Vitamins D | do | 8,000 |
| Vitamins E | milligrams | 90 |
| Vitamin $B_{12}$ | micrograms | 300 |
| Thiamin | milligrams | 15 |
| Riboflavin | do | 8 |
| Pantothenic acid | do | 80 |
| Nicotinic acid | do | 80 |
| Pyridoxin | do | 15 |
| Folic acid | do | 7 |
| Biotin | do | 0.3 |
| Cholin | gram | 1.0 |

Furthermore, it contained a total of about 1% of the flavoring substances such as furfural and the like listed hereinbefore.

Example X

A staple feed obtained in this manner was analyzed and showed the following composition (per kg.):

| | | |
|---|---|---|
| Protein | grams | 400 |
| Lipids | do | 70 |
| Ashes | do | 70 |
| Fibrous material of cellulose | do | 80 |
| Water | do | 200 |
| Nitrogen-free extraction products (from carbohydrate materials) | grams | 160 |
| Vitamins A | international units | 60,000 |
| Vitamins D | do | 10,000 |
| Vitamins E | milligrams | 120 |
| Vitamin $B_{12}$ | micrograms | 400 |
| Thiamin | milligrams | 25 |
| Riboflavin | do | 15 |
| Pantothenic acid | do | 100 |
| Nicotinic acid | do | 100 |
| Pyridoxin | do | 25 |
| Folic acid | do | 10 |
| Biotin | do | 0.6 |
| Cholin | grams | 3 |

Furthermore, it contained a total of about 2% of the flavoring substances such as furfural and the like listed hereinbefore.

Example XI

Example I is repeated, but to the resulting 240 kg. of animal feed there are added 250,000 international units per kilogram of vitamin A to enrich the same.

Example XII

Example I is repeated, but to the resulting 240 kg. of animal feed there are added 60,000 international units per kilogram of vitamin D to enrich the same.

Example XIII

Example I is repeated, but to the resulting 240 kg. of animal feed there are added 2,000 micrograms per kilogram of vitamin $B_{12}$ to enrich the same.

Example XIV

Example I is repeated, but to the resulting 240 kg. of animal feed there is added a mixture of 250,000 international units per kilogram of vitamin A, 60,000 international units per kilogram of vitamin D, and 2,000 micrograms per kilogram of vitamin $B_{12}$ to enrich the same.

It will be understood that this invention is susceptible to further modification and, accordingly, it is desired to comprehend such modifications within this invention as my fall within the scope of the appended claim.

I claim:

1. A method for producing a vitamin-enriched, appetite-stimulating feed for fowls and mammals from concentrated, de-oiled fish solubles and edible carbohydrate containing materials, comprising the steps of (a) intimately mixing said concentrated, de-oiled fish solubles with said carbohydrate containing materials in such proportions, depending upon the water content of either component, that the resulting mixture contains maximally about 30% by weight of water and minimally 20% by weight of de-oiled fish solubles, (b) inoculating said mixture with at least one useful bacterium taken from the group of: aerobic bacteria, and (c) subjecting said mixture to fermentation at temperatures between 0° and 45° C.

2. The method described in claim 1, further comprising adding acid-binding agents selected from the group of: alkali earth metal carbonates to said mixture.

3. The method described in claim 1, characterized in that the inoculation under (b) takes place by exposing the mixture in an open vessel to the excess of air-borne bacteria present in the rooms of a fish processing plant.

4. The method described in claim 1, characterized in that the inoculation is carried out with an inoculant taken from a preceding fermentate made in the same manner.

5. The method of claim 1, wherein the aerobic bacterium is selected from the group consisting of *Streptococcus lactis*, *Streptococcus cremonis*, *Latobacillus leichmannii*, and *Acetobacter*.

6. The method of claim 1, wherein the inoculation is conducted with an inoculant culture comprising a mixture of at least one aerobic bacterium from the group consisting of *Streptococcus lactis*, *Streptococcus cermonis*, *Lactobacillus leichmannii*, and *Acetobacter*, and one anaerobic bacterium from the group consisting of *Bacterium sacch. butyricus* and Amylobacter.

7. A method for producing a vitamin-enriched, appetite-stimulating feed for fowls and mammals from concentrated, de-oiled fish solubles and edible carbohydrate containing materials, comprising the steps of (a) intimately mixing said concentrated, de-oiled fish solubles with said carbohydrate containing materials in such proportions, depending upon the water content of either components, that the resulting mixture contains maximally about 30% by weight of water and minimally 20% by weight of de-oiled fish solubles, (b) inoculating said mixture with at least one useful bacterium taken from the group of aerobic bacteria, (c) subjecting said mixture to fermentation at temperatures between 0° and 45° C., and (d) adding dehydrating material to the fermenting mixture in such quantities as to reduce the water content of the latter to 18%, thereby interrupting the fermentation of the mixture as soon as organoleptic tests show a satisfactory development of appetizing taste and odor-imparting substances in the fermentate.

8. The method described in claim 7, characterized in that the dehydrating material is a carbohydrate containing animal feed having a water content of up to 3%.

9. The method described in claim 7, characterized in that the dehydrating material is an earth alkali metal carbonate selected from the group consisting of magnesium carbonate, calcium carbonate and mixtures thereof.

10. A method for producing a vitamin-enriched, appetite-stimulating feed for fowls and mammals from concentrated, de-oiled fish solubles and edible carbohydrate containing materials, comprising the steps of (a) reducing the water content of concentrated de-oiled fish solubles to maximally 40%, (b) intimately mixing the fish solubles of reduced water content with carbohydrate containing material having a water content of maximally 15% in such proportions, depending on the water content of either component, that the resulting mixture contains maximally about 30% by weight of water and minimally 20% by weight of de-oiled fish solubles, (c) inoculating said mixture with at least one useful bacterium taken from the group of aerobic bacteria, (d) subjecting said mixture to fermentation at temperatures between 0° and 45° C., and (e) adding dehydrating material to the fermenting mixture in such quantities as to reduce the water content of the latter to 18%, thereby interrupting the fermentation of the mixture as soon as organoleptic tests show a satisfactory development of apetizing taste and odor-imparting substances in the fermentate.

11. A method for producing a vitamin-enriched, appetite-stimulating feed for fowls and mammals from concentrated, de-oiled fish solubles and edible carbohydrate containing materials, comprising the steps of (a) intimately mixing said concentrated, de-oiled fish solubles with said carbohydrate containing materials in such proportions, depending upon the water content of either component, that the resulting mixture contains maximally about 30% by weight of water and minimally 20% by weight of de-oiled fish solubles, (b) inoculating said mixture with at least one useful bacterium taken from the group of aerobic bacteria, (c) subjecting said mixture to fermentation at temperatures between 0° and 45° C., and adding to the resulting fermentate at least one feed enriching agent.

12. The method described in claim 11, characterized in that said feed enriching agent is a vitamin.

13. The method described in claim 11, characterized in that said feed enriching agent is a mixture of vitamins.

14. The method described in claim 11, characterized in that said feed enriching agent is a mineral salt.

15. The method described in claim 11, characterized in that said feed enriching agent is a compound of a trace element selected from the group consisting of iron, manganese, copper, cobalt, zinc, iodine, and fluorine.

16. A method for producing a vitamin-enriched, appetite-stimulating feed for fowls and mammals from concentrated, de-oiled fish solubles and edible carbohydrate-containing materials, comprising the steps of (a) intimately mixing said concentrated, de-oiled fish solubles with said carbohydrate-containing materials in such proportions, depending upon the water content of either component, that the resulting mixture contains maximally about 30% by weight of water and minimally 20% by weight of de-oiled fish solubles, (b) inoculating said mixture with at least one useful bacterium taken from the group of anaerobic bacteria, and (c) subjecting said mixture to fermentation at temperatures between 0° and 45° C.

17. The method described in claim 16, wherein the anaerobic bacterium is selected from the group consisting of *Bacterium sacch. butyricus* and Amylobacter.

18. A method for producing a vitamin-enriched, appetite-stimulating feed for fowls and mammals, comprising the steps of (a) intimately mixing concentrated, de-oiled fish broth of about 50% solids and a carbohydrate fodder in such ratio depending on the water content of each component, that the resulting mixture contains more than 60% by weight of solid matter, and minimally 20% by weight of de-oiled fish solubles, (b) fermenting the mixture by the step consisting of exposing said mixture to air at a room temperature between approximately 16-25° C., and (c) adding calcium carbonate as a dehydrating substance to the mixture in such quantities as to interrupt the fermentation process.

19. A method for producing a vitamin-enriched, appetite-stimulating feed for fowls and mammals, comprising the steps of (a) intimately mixing about 100 parts by weight of concentrated, de-oiled fish broth of about 50% solids and 150 parts by weight of cereal grist with each other so as to obtain a mixture containing more than 60% of solid matter, (b) fermenting the mixture by the step consisting of exposing said mixture to air at a room temperature between approximately 16-25° C., and (c) adding calcium carbonate as a dehydrating substance to the mixture in such quantities as to interrupt the fermentation process.

References Cited in the file of this patent
UNITED STATES PATENTS

| | | |
|---|---|---|
| 1,851,253 | Kahn | Mar. 29, 1932 |
| 2,168,722 | Townsend | Aug. 8, 1939 |